Feb. 14, 1956  M. W. BRAINARD  2,734,487
CONSTRUCTION FOR MACHINES SUCH AS ENGINES OR THE LIKE
Filed Nov. 29, 1951  4 Sheets-Sheet 1
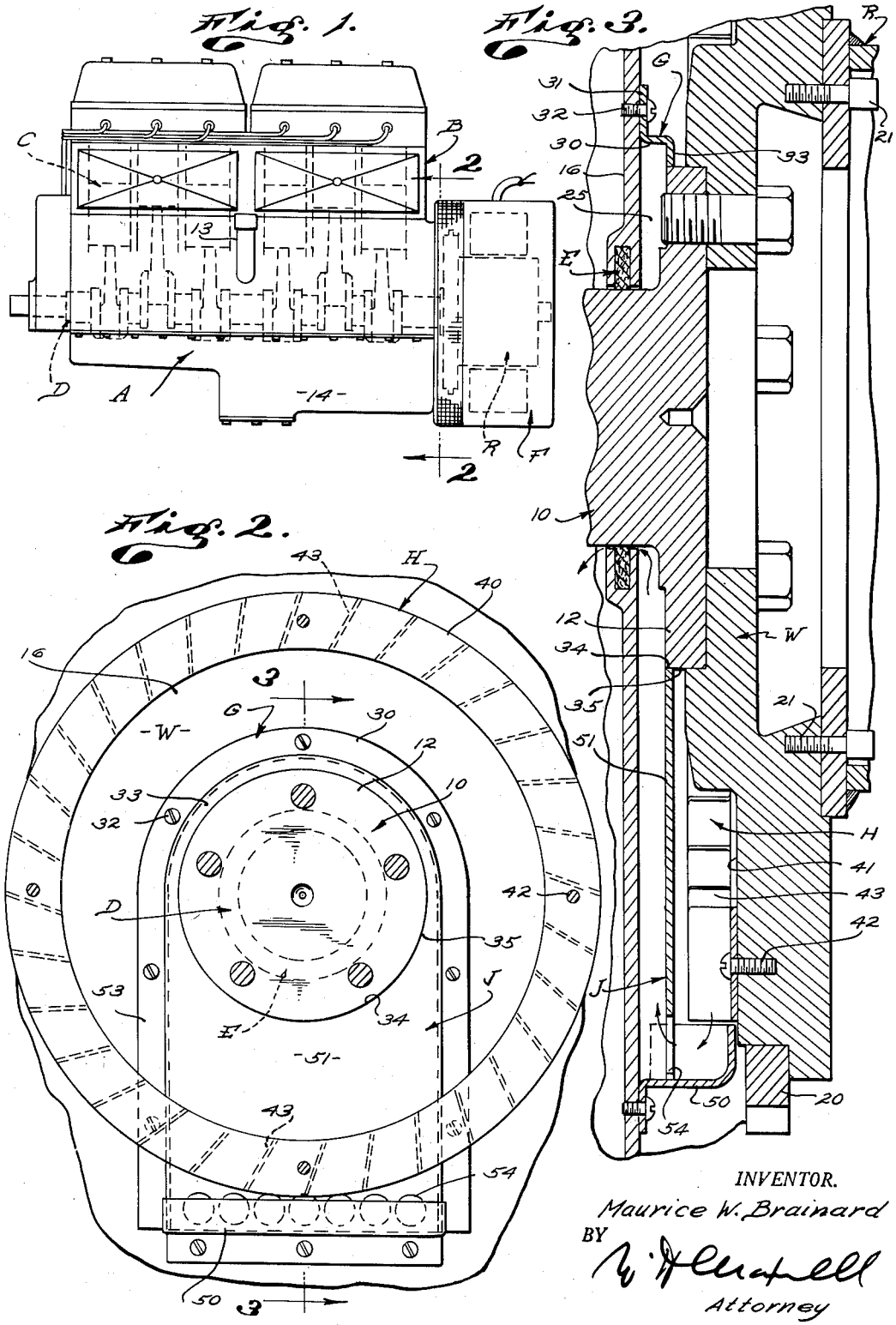
INVENTOR.
Maurice W. Brainard
BY
Attorney

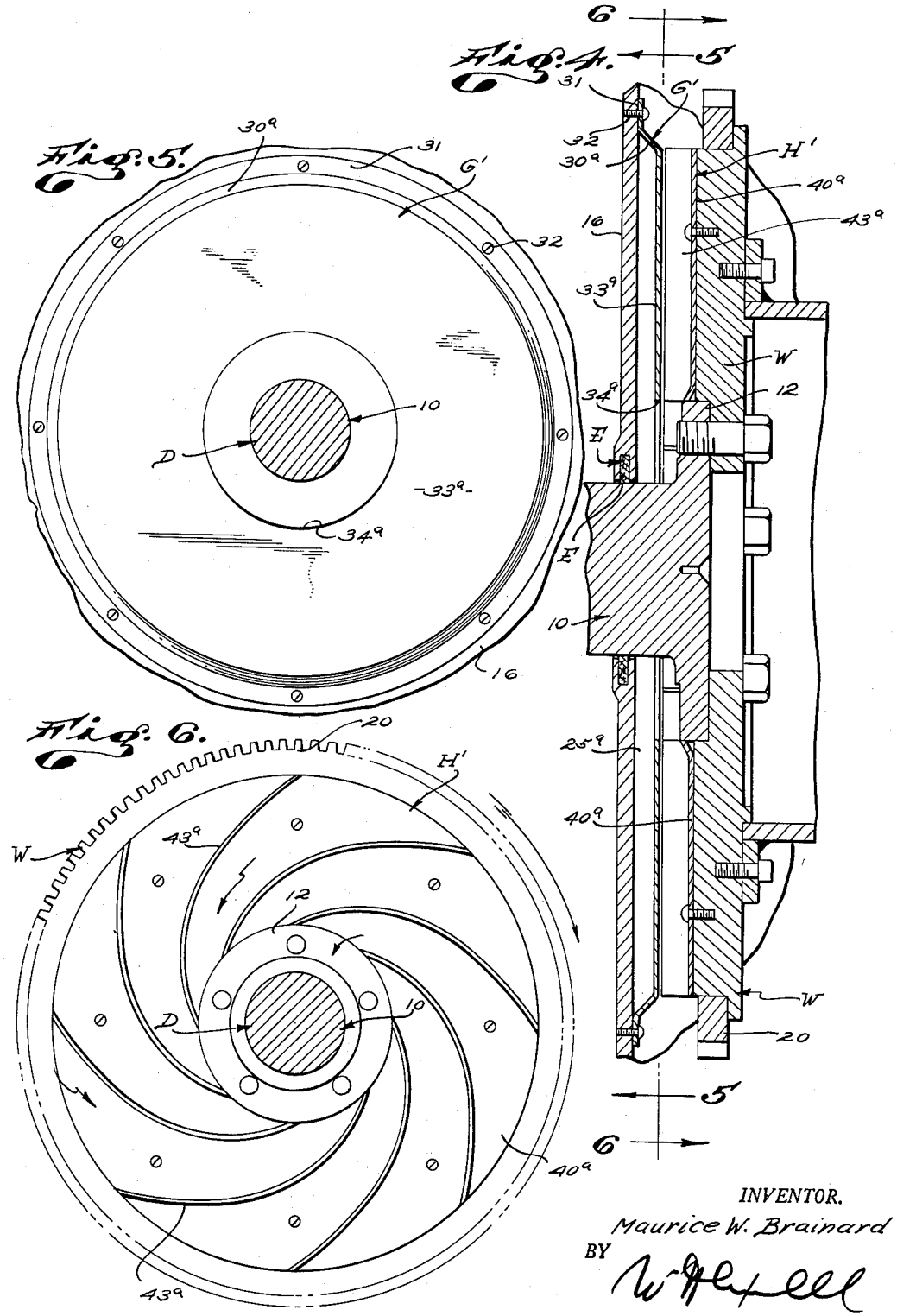

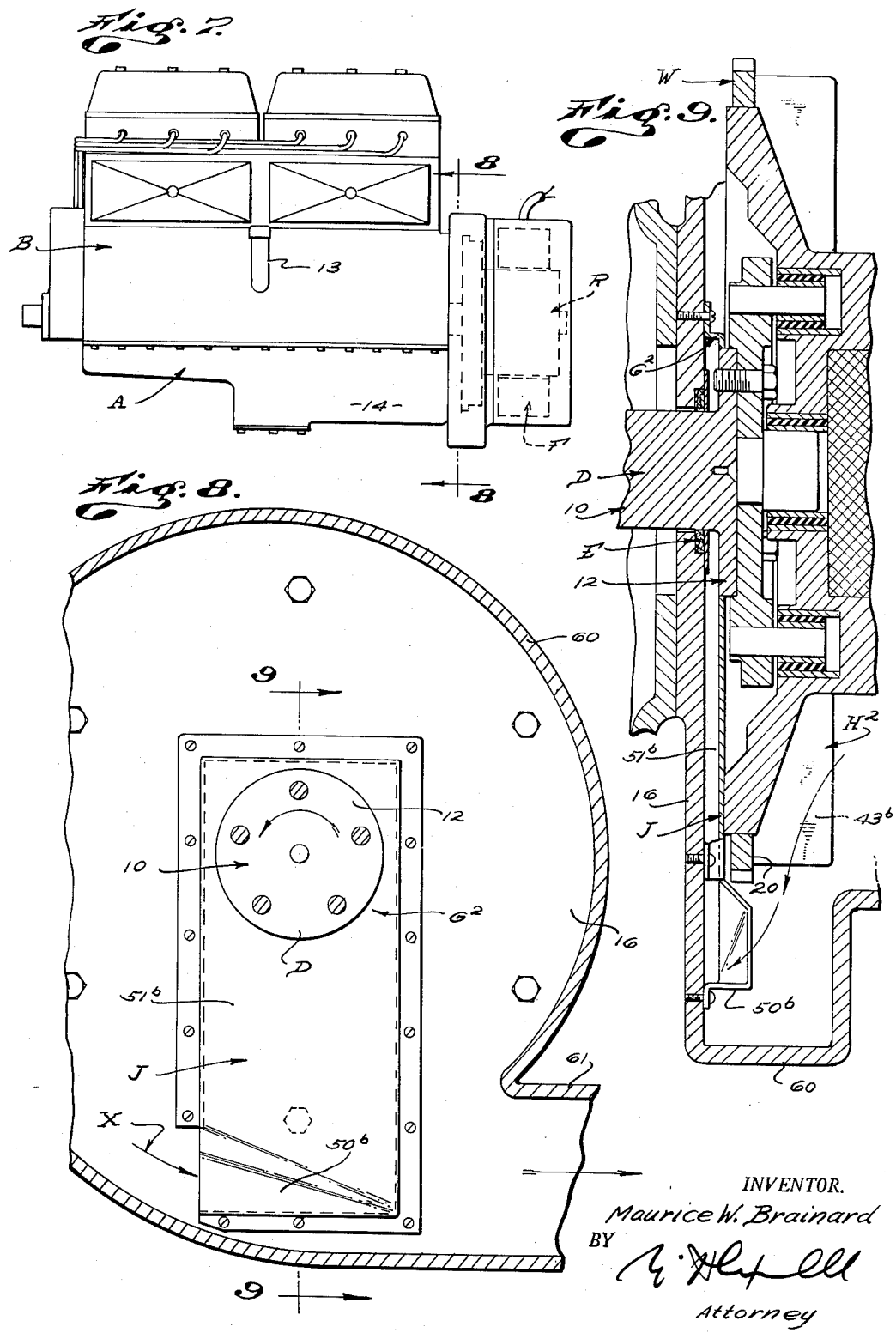

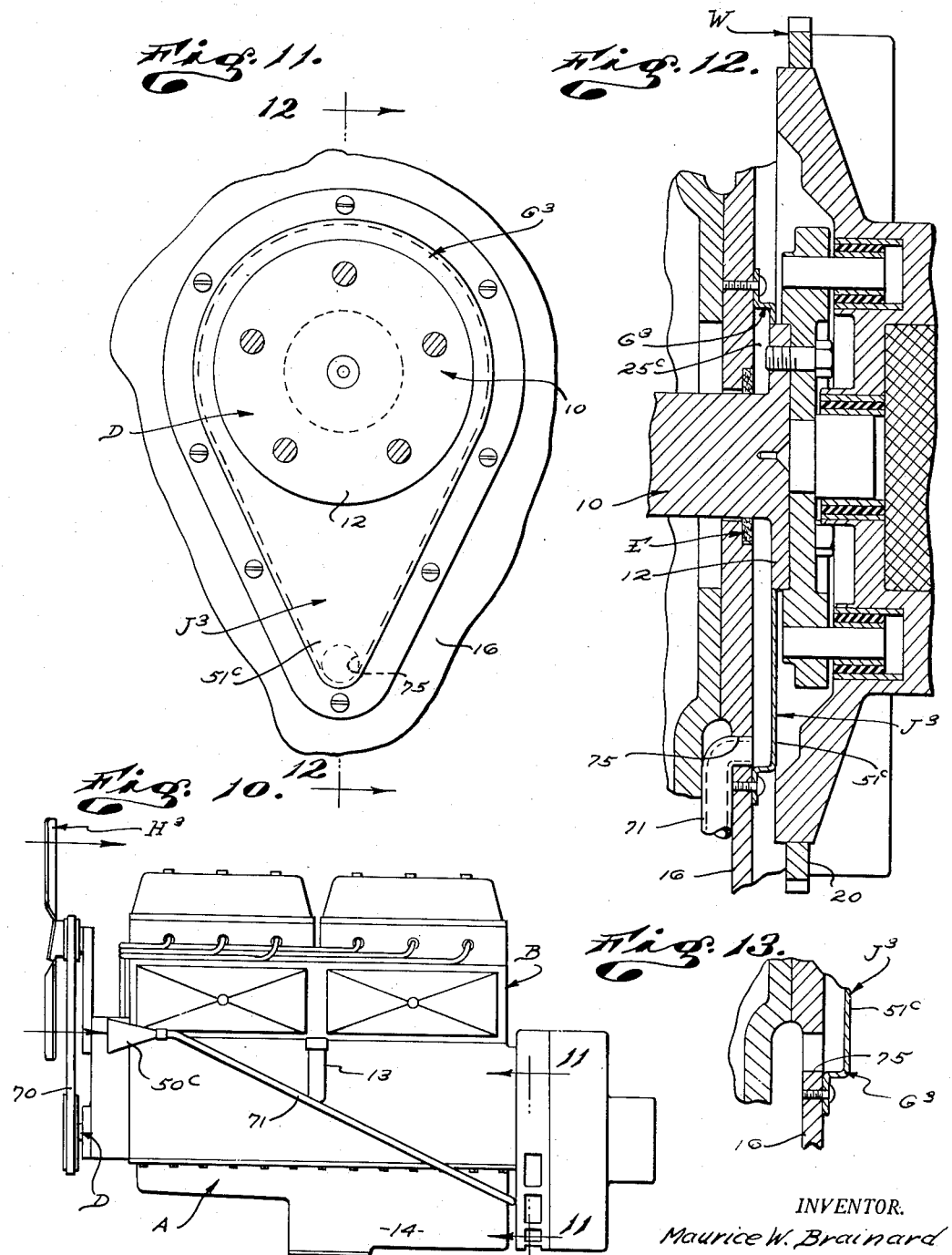

United States Patent Office 2,734,487
Patented Feb. 14, 1956

2,734,487

CONSTRUCTION FOR MACHINES SUCH AS ENGINES OR THE LIKE

Maurice W. Brainard, Los Angeles, Calif., assignor of one-half to O'Keefe & Merritt Company, Los Angeles, Calif., a corporation of California Application November 29, 1951, Serial No. 258,895

15 Claims. (Cl. 121—194)

This invention has to do with a construction for machines such as engines or like mechanisms, it being a general object of the invention to provide a construction for a mechanism of the type wherein a shaft projects from a lubricant carrying case, which construction is simple, and commercially practical, and serves to prevent leakage of lubricant from the case where the shaft issues therefrom. In referring to machines or engines, I mean to include or refer to any structures or machines wherein a lubricant carrying case, or the like, has a shaft projecting through it and where there is normally a tendency for the lubricant to leak from the case around the shaft.

In the usual internal combustion engine of the reciprocating type and in the case of other similar mechanisms, say, for instance, compressors, pumps, etc., the stationary or fixed structure includes a case carrying a cylinder block and a working mechanism and serving as a reservoir for lubricating oil. The usual working mechanism includes pistons in the cylinder block coupled to a crank shaft that projects from the case and carries or drives a fly-wheel at the exterior of the case, and in many instances auxiliary equipment such as a clutch, a generator, a fan, etc. It is common to provide an engine case with a breather pipe which makes the interior of the case subject to atmospheric pressure and to a large extent neutralizes or reduces pulsation of pressure in the case due to piston action. In the usual construction of the character referred to the fly-wheel provided on the shaft is carried by a flange or coupling on the shaft located immediately outside the case, and as the engine operates the fly-wheel creates a flow of air, with the result that less than atmospheric pressure prevails at or around the shaft where the shaft issues from the case. It has long been recognized that in structures of the character referred to there is a marked tendency for the lubricant carried by the case to seep or leak therefrom where the shaft issues from the case, and to check or limit this flow of lubricant numerous packing means or seals have been devised and employed. In the case of some complicated expensive seal constructions results are reasonably satisfactory, but even then, in the event of slight imperfection or after wear, leakage of the seal is likely to occur.

It is a general object of this invention to provide a construction for an engine, or the like, whereby the tendency for lubricant to leak from the case and around the shaft projecting from the case is effectively neutralized, with the result that, if anything, there is a tendency for leakage to occur inward along the shaft, rather than outward.

Another object of this invention is to provide a construction of the general character referred to that can be incorporated in an engine, or the like, in the course of construction by the addition of a few simple parts, and at a very nominal cost.

Another object of the invention is to provide a structure of the general character referred to which can, in practice, be added to or incorporated in a conventional engine construction after the usual construction has been completed, without materially complicating or encumbering the engine and at a very nominal cost.

The construction contemplated by the present invention, being applicable, generally, to engines or the like, of the reciprocating type, is necessarily subject to wide variation as to form and construction, in that construction of such machines varies widely with the size of the engine, the class of service to be performed, and other such factors. To set forth the principles of the invention I have, in the drawings, illustrated several different forms and applications, and it will be recognized from the drawings that the construction of the present invention contemplates, generally, a shield combined with the engine construction and more particularly with the case of the engine, the shaft projecting from the case, and possibly with the fly-wheel, to establish a chamber around the shaft and adjacent the case where the shaft issues from the case. It is generally practical to fix the shield to the case and to form the shield with the body portion projecting axially from the case and around the shaft with clearance. The shield may have a plate portion in a plane normal to the axis of the shaft projecting inward from the axially projecting body and having an opening concentric with the shaft. The opening in the plate of the shield may slidably accommodate the shaft or a part of the shaft, such as the fly-wheel coupling of the shaft, or it may be open forming a duct to pass air into the chamber formed by the shield. Air may be admitted to the chamber formed by the shield at atmospheric pressure or, and preferably, an impeller is provided to supply air at superatmospheric pressure. In a usual situation the air handling impeller may be mounted on or formed as a part of the fly-wheel coupled to the shaft, or any air impeller combined with or related to the engine may be utilized. For instance, the usual cooling fan of the engine may be employed.

The invention contemplates that a suitable passage or duct be provided from the source of air as, for instance from the impeller to the shield, so that as the engine operates air is maintained in the chamber established by the shield at a superatmospheric pressure. As a result of the condition established by the structure of the present invention air normally tends to circulate or flow inwardly along the shaft and into the case, regardless of the negative pressure created by the fly-wheel and regardless of the pulsating condition prevailing in the case due to piston action or to other conditions normally tending to cause leakage, and as another result of the invention a very simple, inexpensive or common form of seal between the case and shaft is effective to check flow of oil from the case and will remain effective over a long period of time, rather than tending to leak as is ordinarily the case even when the seal is of complicated expensive construction.

The various objects and features of my invention will be fully understood from the following detailed description of typical preferred forms and applications of the invention, throughout which description reference is made to the accompanying drawings, in which:

Figs. 1, 2, and 3, of the drawings occurring on Sheet 1 illustrate one form of the invention, Fig. 1 being a side elevation of an engine of the reciprocating type with the invention incorporated therein and with parts indicated to show the general relationship of parts in the mechanism. Fig. 2 is an enlarged sectional view taken substantially as indicated by line 2—2 on Fig. 1, and Fig. 3 is an enlarged detailed sectional view taken as indicated by line 3—3 on Fig. 2.

Figs. 4, 5, and 6, occurring on Sheet 2 of the drawings, illustrate another form of the invention, Fig. 4 being a view similar to Fig. 3. Fig. 5 is a transverse reduced sectional view taken as indicated by line 5—5 on Fig. 4, and Fig. 6 is a reduced transverse sectional view taken as indicated by line 6—6 on Fig. 4.

Figs. 7, 8, and 9, occurring on Sheet 3 of the drawings, illustrate another form of the invention, Fig. 7 being a view similar to Fig. 1. Fig. 8 is an enlarged detailed transverse sectional view taken as indicated by line 8—8 on Fig. 7, and Fig. 9 is an enlarged detailed sectional view taken on line 9—9 on Fig. 8, being a view similar to Fig. 3.

Figs. 10, 11, 12, and 13, occurring on Sheet 4 of the drawings, are views illustrating another form of the invention, Fig. 10 being a view similar to Fig. 1. Fig. 11 is an enlarged detailed sectional view taken substantially as indicated by line 11—11 on Fig. 10. Fig. 12 is an enlarged detailed sectional view taken as indicated by line 12—12 on Fig. 11, and Fig. 13 is a view of a portion of the mechanism shown in Fig. 12 modified by elimination of a portion of the duct conducting air to the portion of the chamber established by the shield.

The construction provided by the present invention is such that it can be incorporated to advantage in machines such as compressors, pumps, turbines, engines, etc. I will refer to a reciprocating engine as typical of the type of machine to which the invention can be applied and the term engine is therefore used to include other mechanisms of the general character referred to. An ordinary internal combustion engine of the reciprocating type includes, generally, a case A carrying a cylinder block B in which pistons C operate. The pistons C are coupled to a crank shaft D supported by the case and in a typical construction an end portion 10 of the shaft D projects from an end of the case. A fly-wheel W is provided at the exterior of the case and is connected to the portion 10 of the shaft D by a coupling flange 12 on the shaft portion 10 at the exterior of the case A. A breather pipe 13 is provided on or projects from the case A and opens the interior of the case A to atmospheric pressure. As the engine operates the shaft D rotates, the pistons C reciprocate, and the wheel W on the shaft rotates. It is common to form the case 10 with a sump portion 14 and a suitable quantity of lubricating oil is carried in the case to lubricate the working parts as the engine operates. As a result of reciprocation of the pistons there is a pulsating pressure in the case A and in an ordinary engine construction as the wheel W rotates it causes a flow or movement of air and a resulting reduced pressure or subatmospheric pressure where the shaft portion 10 issues from the case. In accordance with the present invention, a shaft seal E is provided between the wall 16 of the case adjacent the wheel W and the shaft portion 10, and in an ordinary engine construction this is the sole means serving to prevent leakage or seepage of oil from the case A to the exterior of the case around the shaft portion.

It is to be understood that the structure provided by the present invention and which is hereinafter described may, in practice, be carried out in connection with engines of various constructions or those designed for various purposes. In the usual engine construction the wheel W is equipped with an annular toothed member or gear 20 adapted to be engaged by a starting pinion. In some cases the wheel W is attached to or incorporated as a part of a clutch whereas in other cases it may serve to drive devices or equipment. In Figs. 1 and 3 of the drawings, the wheel W there illustrated is shown driving the rotor R of a generator F. The rotor of the generator is connected to the wheel W by suitable fasteners 21.

The form of the invention illustrated on Sheet 1 of the drawings includes, generally, a shield G establishing an air chamber 25 around the shaft portion 10 between the wall 16 of the case A and the wheel W and an air handling impeller operated by and preferably carried directly on the wheel W and serving to deliver air at superatmospheric pressure. An air duct J is provided receiving air delivered by the impeller and conducting it to the chamber 25 so that air is maintained about the projecting portion 10 of the shaft D at a pressure equal to, if not greater than, that occurring within the case A. With the arrangement of elements provided by the invention the air is delivered by the impeller H at a pressure somewhat above atmospheric pressure, and as a result a superatmospheric pressure is maintained in chamber 25.

The shield G in this form of the invention is cooperatively related to the case A, shaft D, and wheel W, and the particular case illustrated in the drawings includes a body portion 30 extending around the shaft 10 with substantial clearance and mounted on or fixed to the wall 16 of the case A by a mounting flange 31 which projects from the body 30 and is secured to the wall 16 by suitable fasteners 32. The shield includes a plate portion 33 which may be a simple flat plate disposed in a plane normal to the axis of the shaft D and projecting inward from the outer or terminal end of the body 30. In the form of the invention under consideration the plate 33 has a round opening 34 concentric with shaft D and the parts are related so that the coupling flange 12 on the shaft portion 10 carrying wheel W has its periphery 35 turned so that it is concentric with the shaft and the opening 34 slidably receives the coupler or coupling 12, as clearly illustrated in Fig. 3. As a result of the combining of the shield G with the engine parts, as hereinabove described, a chamber 25 is provided around the projecting portion 10 of shaft D which carries the coupler 12.

In the form of the invention under consideration the air handling impeller H is carried by or fixed to the side of the wheel adjacent or opposing the wall 16 of the case A. The particular impeller illustrated is in the nature of a unit or attachment applicable to the wheel W and it is characterized by an annular member or ring 40 secured to the side 41 of the wheel W facing the case A by suitable fasteners 42. A plurality of vanes 43 projects from the ring 40 and toward the case A and the vanes are pitched so that as the wheel W rotates air is circulated or handled by the impeller so as to be driven or forced radially outward to discharge or flow from the outer periphery of the impeller. It is to be understood that in practice the size of the impeller, the number of vanes 43 involved, and other such factors may be varied to gain the desired radial flow of air.

The duct J is provided to receive air at the outer peripheral portion of the impeller H and to deliver the air thus received to the chamber 25 established by the shield G. In the case illustrated the duct J includes a scoop or catcher portion 50 that projects from the wall 16 of the case A in the direction of the wheel W and overlies the periphery of the impeller H so that as the wheel operates air delivered by the impeller is caught by the scoop 50 and handled as indicated by the arrows in Fig. 3. The duct J further includes an air conducting portion 51 extending from the scoop 50 to the shield G. In the particular case illustrated the duct portion 51 is a simple straight air handling duct having flanges 53 by which it is secured to the wall 16 and it extends radially from the shield G to the scoop 50. Where the duct portion 51 meets or is connected to the scoop 50 air handling openings 54 are provided so that the air received by the scoop is admitted to the duct portion 51 to flow therethrough to the shield G, with the result that a suitable pressure is maintained in the chamber 25.

In accordance with the present invention it is preferred to fit the plate 33 of the shield G to the coupler 12 of the shaft D with reasonable accuracy. However, if there is a leakage or escape of air outwardly between these parts this is in no way disagreeable as such air can then flow outwardly and be handled by the impeller. With the construction provided by the invention the seal or packing means E may be a simple annular packing ring carried by the wall 16 of the case and engaged around the shaft portion 10 and as the engine operates if the seal or packing means E is not tight but does allow leakage, the leakage is of air inwardly along or around the shaft 10 from the chamber 25 into the case A. As a result of this inward circulation or leakage of air, escape or leakage of lubricating oil from the case A is checked or minimized so that it is negligible.

In the form of the invention illustrated on Sheet 2 the shield $G^1$ provided by the invention has a body portion $30^a$ secured to the wall 16 of the engine case through a flange 31 and fastening means 32. The plate $33^a$ of the shield is joined to the outer or terminal end of the body $30^a$ and projects radially inward and has an opening $34^a$ concentric with the shaft portion 10. In this case the wall $33^a$ is located so that it is spaced between or from the wall 16 and also from the coupling 12 of shaft 10.

The impeller $H^1$ in this form of the invention handling air includes a ring $40^a$ secured to the side of the wheel W facing the case wall 16 and vanes $43^a$ project from the ring. In this case the vanes are formed and pitched so that as the wheel rotates they catch air at the outer periphery of the impeller and cause it to circulate inward and be discharged at the central portion of the impeller, as indicated by the arrows in Fig. 6. It is preferred in this case that the impeller be of substantial radial extent and that the plate $33^a$ of the shield $G^1$ be located relative to the vanes $43^a$ of the impeller so that air is trapped by or confined to the impeller to be effectively circulated inward as the wheel rotates.

With the form of the invention just described the opening $34^a$ in the plate 33 of the shield $G^1$ forms a duct that conducts air delivered by the impeller $H^1$ to the chamber $25^a$ formed by the shield as indicated by the arrows in Fig. 4.

With the form of the invention just described, as the engine operates and the wheel W turns, air handled by the impeller $H^1$ is caused to circulate or flow inward establishing a superatmospheric pressure at the central portion of the structure or immediately around the shaft portion 10 where it issues from the case A, with the result that if there is leakage of the packing or sealing means E it is inward or from the chamber $25^a$ into the case A.

In the form of the invention illustrated on Sheet 3 of the drawings the shield $G^2$ may be substantially the same as that first described and shown on Sheet 1 of the drawings. The impeller or air circulating means $H^2$ in this form of the invention is a construction formed on or as an integral part of the wheel W, being in the form of a suitable series of blades or vanes $43^b$ formed on and projecting from the side of the wheel W remote from the wall 16 of the case. In this particular construction the impeller $H^2$ is provided to deliver a substantial volume of air and the stream of air delivered as the wheel rotates is adapted to be caught in a housing 60 surrounding the wheel and projecting from the wall 16 of the case, the housing being provided with an outlet portion 61 as clearly illustrated in Fig. 8 of the drawings. As a result of this construction as the wheel W rotates and the impeller $H^2$ delivers air, the air flows or circulates around in the housing 60 in the direction of the arrow X in Fig. 8.

The duct J in the form of the invention shown on Sheet 3 includes a scoop portion $50^b$ located outward of the impeller $H^2$ and in the stream of air being handled by the housing 60, so that it catches a part of the air thus circulated. A duct portion $51^b$ extends from the scoop $50^b$ to the shield $G^2$, as clearly illustrated in the drawings.

From the foregoing description it will be apparent that the structure illustrated on Sheet 3 of the drawings operates in substantially the same manner as that illustrated on Sheet 1 of the drawings, to the end that if there is leakage of the seal provided between the shaft and the case of the engine it is inward, with the result that oil does not find its way out of the case where the shaft issues from the case.

In the form of the invention illustrated on Sheet 4 of the drawings the shield $G^3$ may be substantially the same as that illustrated in Sheets 1 and 3. In this form of the invention the duct $J^3$ connects to the chamber $25^c$ established by the shield $G^3$ so that air received by the duct is supplied to the chamber $25^c$. In the case illustrated in Figs. 10, 11, and 12, the impeller $H^3$ provided to supply air is shown as a fan driven from the shaft D of the engine through a belt 70. A scoop $50^c$ is provided to catch air from the stream of air delivered by the fan and an extension 71 of the scoop continuing from the duct portion $51^c$ conducts the air received by the scoop $50^c$ to duct portion $51^c$ so that this air in turn flows into the chamber $25^c$. It is to be observed from Fig. 10 that the fan serving as the impeller $H^3$ is of general utility and may serve as the general cooling fan for the engine.

In the form illustrated in Fig. 13, the extension 71 of the duct is eliminated, in which case atmospheric pressure is admitted to the duct portion $51^c$ through the opening 75 provided in the wall 16 of the case, which opening accommodates the duct extension 71 in the case shown in Figs. 10, 11, and 12.

In the case shown in Fig. 13 the air pressure maintained in the chamber immediately around the shaft where the shaft issues from the case is atmospheric and therefore at least equal to the average pressure condition maintained in the case, with the result that the tendency for oil to leak around the shaft is reduced if not completely eliminated.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, a machine having a case, a shaft projecting from the case to the exterior thereof, and a wheel on the shaft external of the case, blades on the wheel adapted to move air as the wheel rotates, a shield around the shaft between the case and wheel establishing a chamber surrounding the shaft where the shaft issues from the case, and a duct adapted to pass air moved by the blades on the wheel to the chamber.

2. In combination, a machine having a closed case, a shaft projecting from the case to the exterior thereof, and a wheel on the shaft external of the case with a part accessible to receive a driven element, a shield carried by the case and spaced radially of the shaft and extending around the shaft between the case and the wheel establishing a chamber surrounding the shaft where the shaft issues from the case, a duct between the case and wheel adapted to pass air to the chamber from the exterior of the shield, and an impeller on the wheel adapted to deliver air to the duct.

3. In combination, a machine having a closed case, a shaft projecting from the case to the exterior thereof, and a wheel on the shaft external of the case with a part adapted to carry a driven element, a shield carried by the case and spaced radially of the shaft and extending around the shaft between the case and wheel establishing a chamber surrounding the shaft where the shaft issues from the case, a duct between the case and wheel adapted to pass air to the chamber, and an impeller carried by the wheel at one side thereof and adapted to deliver air to the duct.

4. In combination, a machine having a closed case, a shaft projecting from the case to the exterior thereof, and a wheel on the shaft external of the case with a part adapted to carry a driven element, a shield carried by the case and spaced radially of the shaft and extending around the shaft between the case and wheel establishing a chamber surrounding the shaft where the shaft issues from the case, a duct between the case and wheel adapted to pass air to the chamber, and an impeller carried by the wheel and adapted to deliver air to the duct, the impeller including vanes on the side of the wheel opposing the case and adapted to circulate air radially of the wheel as the wheel rotates.

5. In combination, a machine having a closed case, a shaft projecting from the case to the exterior thereof, and a wheel on the shaft external of the case and having a part adapted to carry a driven element, a shield on the exterior of the case spaced radially of the shaft and extending around the shaft between the case and wheel establishing a chamber surrounding the shaft where the shaft issues from the case, a duct between the case and wheel adapted to pass air to the chamber, and an impeller on the wheel adapted to deliver air to the duct, the duct including a scoop portion receiving air from the impeller.

6. In combination, a machine having a case, a shaft projecting from the case, and a wheel on the shaft external of the case and having a part adapted to carry a driven element, a shield carried by the case spaced radially of the shaft and extending around the shaft between the case and wheel establishing a chamber surrounding the shaft where the shaft issues from the case, and an impeller carried by the wheel and adapted to deliver air for charging the chamber, the impeller including vanes on the wheel delivering air outwardly away from the shaft as the shaft rotates, there being a scoop outward of the vanes receiving air from the impeller for flow therefrom to the chamber.

7. In combination, a machine having a case, a shaft projecting from the case, and a wheel on the shaft external of the case and having a part adapted to drive a driven element, a shield carried by the case spaced radially of the shaft and extending around the shaft between the case and wheel establishing a chamber surrounding the shaft where the shaft issues from the case, and a duct between the case and wheel adapted to pass air to the chamber, the duct being located in the shield and surrounding the shaft.

8. In combination, a machine having a case, a shaft projecting outwardly from the case, and a wheel on the shaft external of the case and having a part adapted to drive a driven element, a shield carried by the case spaced radially of the shaft and extending around the shaft between the case and wheel establishing a chamber surrounding the shaft where the shaft issues from the case, and a duct between the case and wheel adapted to pass air to the chamber, the shaft having a coupling thereon carrying the wheel and the shield having a body portion carried by the case and extending outwardly therefrom around the shaft and spaced from the shaft and having a plate portion spaced from the case and projecting inward from the outer end of the body and provided with a central opening rotatably receiving the coupling.

9. In combination, a machine having a case, a shaft projecting from the case, and a wheel on the shaft external of the case and having a part adapted to drive a driven element, a shield carried by the case spaced radially of the shaft and extending around the shaft between the case and wheel establishing a chamber surrounding the shaft where the shaft issues from the case, a duct between the case and wheel adapted to pass air to the chamber, and an impeller adapted to deliver air to the duct, the impeller including a ring fixed to the wheel at the side of the wheel opposing the case and vanes projecting from the ring.

10. In combination, a machine having a case, a shaft projecting from the case to the exterior thereof, a seal between the shaft and case where the shaft issues from the case, and a wheel on the shaft external of the case adapted to receive a driven element and with parts thereon adapted to circulate air as the wheel turns, a shield on the case spaced from the shaft and extending around the shaft between the case and wheel establishing a chamber surrounding the shaft where the shaft issues from the case, and a duct adapted to pass air circulated by the wheel to the chamber.

11. In combination, a machine having a case, a shaft projecting outwardly from the case, and a wheel on the shaft external of the case adapted to receive a driven element, a shield on the case spaced from the shaft and extending around the shaft between the case and wheel establishing a chamber surrounding the shaft where the shaft issues from the case, a duct between the case and wheel adapted to pass air to the chamber, and an impeller carried by the wheel at the side thereof opposing the case and adapted to deliver air to the duct, the impeller including vanes delivering air outwardly away from the shaft as the shaft rotates, the shaft having a coupling thereon carrying the wheel and the shield having a body portion carried by the case and extending outwardly therefrom around the shaft and spaced from the shaft and having a plate portion spaced from the case and projecting inward from the outer end of the body and provided with a central opening rotatably receiving the coupling.

12. In combination, an engine having a case, a shaft projecting outwardly from the case, and a wheel on the shaft external of the case adapted to receive a driven element, a shield on the case spaced from the shaft and extending around the shaft between the case and wheel establishing a chamber surrounding the shaft where the shaft issues from the case, a duct between the case and wheel adapted to pass air to the chamber, and an impeller carried by the wheel and adapted to deliver air to the duct, the impeller including vanes delivering air outwardly away from the shaft as the shaft rotates, the shaft having a coupling thereon carrying the wheel and the shield having a body portion carried by the case and extending outwardly therefrom around the shaft and spaced from the shaft and having a plate portion spaced from the case and projecting inward from the outer end of the body and provided with a central opening rotatably receiving the coupling, the duct including an air scoop outward of the impeller and a duct portion in communication with the scoop and extending to the chamber.

13. In combination, an engine having a case, a shaft projecting from the case, and a wheel on the shaft external of the case adapted to receive a driven element and with parts thereon adapted to circulate air as the wheel turns, a shield on the case spaced from the shaft and extending around the shaft between the case and wheel establishing a chamber surrounding the shaft where the shaft issues from the case, a duct between the wheel and case and adapted to pass air to the chamber, and an impeller carried by the wheel and adapted to deliver air to the duct, the impeller including vanes at the side of the wheel remote from the case delivering air radially outward as the wheel rotates.

14. In combination, an engine having a case, a shaft projecting from the case, and a wheel on the shaft external of the case adapted to receive a driven element and with parts thereon adapted to circulate air as the wheel turns, a shield on the case spaced from the shaft and extending around the shaft between the case and wheel establishing a chamber surrounding the shaft where the shaft issues from the case, a duct between the case and wheel adapted to pass air to the chamber, and an impeller adapted to deliver air to the duct, the case having a housing portion surrounding the peripheral portion of the wheel and the impeller including vanes on the wheel at the side remote from the case.

15. In combination, a machine having a case, a shaft projecting from the case, and a wheel on the shaft external of the case and having a part adapted to drive a driven element, a shield carried by the case spaced radially of the shaft and extending around the shaft between the case and wheel establishing a chamber surrounding the shaft where the shaft issues from the case, a duct between the case and wheel adapted to pass air to the chamber, and an impeller adapted to deliver air to the duct, the impeller including vanes on the side of the wheel remote from the case.

References Cited in the file of this patent

UNITED STATES PATENTS

| | | |
|---|---|---|
| 819,820 | Tingley | May 8, 1906 |
| 1,391,293 | Balough | Sept. 20, 1921 |
| 2,353,478 | La Bour | July 11, 1944 |
| 2,477,334 | Hibner et al. | July 26, 1949 |
| 2,484,275 | Eastman | Oct. 11, 1949 |
| 2,494,971 | Summers | Jan. 17, 1950 |
| 2,541,850 | Wade | Feb. 13, 1951 |
| 2,603,201 | Kiekhaefer | July 15, 1952 |

FOREIGN PATENTS

| | | |
|---|---|---|
| 308,722 | Great Britain | 1930 |